United States Patent
Pfeil et al.

(10) Patent No.: US 11,587,328 B2
(45) Date of Patent: Feb. 21, 2023

(54) METHOD FOR OPERATING A SENSOR UNIT OF A VEHICLE

(71) Applicant: Robert Bosch GmbH, Stuttgart (DE)

(72) Inventors: Jerg Pfeil, Cleebronn (DE); Matthias Settele, Stuttgart (DE); Maximilian Wolf, Ketsch (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 16/872,789

(22) Filed: May 12, 2020

(65) Prior Publication Data

US 2020/0371519 A1  Nov. 26, 2020

(30) Foreign Application Priority Data

May 20, 2019  (DE) .......................... 102019207302.6

(51) Int. Cl.
| | |
|---|---|
| G06V 20/56 | (2022.01) |
| H04W 4/46 | (2018.01) |
| G01S 13/931 | (2020.01) |
| G01S 13/87 | (2006.01) |
| G01S 17/86 | (2020.01) |

(52) U.S. Cl.
CPC .............. *G06V 20/56* (2022.01); *H04W 4/46* (2018.02)

(58) Field of Classification Search
CPC . G06V 20/56; H04W 4/46; G01S 2013/9316; G01S 13/87; G01S 13/931; G01S 17/931; B60R 16/0237
See application file for complete search history.

(56) References Cited

U.S. PATENT DOCUMENTS

| | | | | |
|---|---|---|---|---|
| 9,355,564 | B1* | 5/2016 | Tyson | G05D 1/104 |
| 9,638,526 | B1* | 5/2017 | Gavrilets | G05D 1/0808 |
| 10,719,076 | B1* | 7/2020 | Gavrilets | G01S 19/51 |
| 10,921,462 | B2* | 2/2021 | Miller | G01S 19/49 |
| 11,009,355 | B2* | 5/2021 | Cai | G01S 7/4808 |
| 2019/0069052 | A1* | 2/2019 | Al-Stouhi | H04W 4/40 |
| 2019/0078895 | A1* | 3/2019 | Ma | G01C 21/1656 |
| 2019/0094387 | A1* | 3/2019 | Miller | G01C 21/165 |
| 2020/0348143 | A1* | 11/2020 | Godha | H04W 4/026 |

\* cited by examiner

*Primary Examiner* — Frederick M Brushaber
(74) *Attorney, Agent, or Firm* — Norton Rose Fulbright US LLP; Gerard Messina

(57) ABSTRACT

A method for operating a sensor unit of a vehicle. The method includes providing a time signal for the sensor unit of a first vehicle, it also being possible to provide the time signal for at least one sensor unit of a second vehicle, and controlling sensor devices of the sensor unit using the time signal for detecting an environment of the vehicle in a temporally defined manner; and providing the detected environment data.

13 Claims, 3 Drawing Sheets

METHOD FOR OPERATING A SENSOR UNIT OF A VEHICLE

CROSS REFERENCE

The present application claims the benefit under 35 U.S.C. § 119 of German Patent Application No. DE 102019207302.6 filed on May 20, 2019, which is expressly incorporated herein by reference in its entirety.

FIELD

The present invention relates to a method for operating a sensor unit (device) of a vehicle. The present invention also relates to a sensor unit of a vehicle. The present invention furthermore relates to a computer program. The present invention furthermore relates to a machine-readable storage medium.

BACKGROUND INFORMATION

Some conventional environment models are produced by an amalgamation of different sensor data, in order to represent a real world as accurately as possible by way of the environment models. The sensor data must be recorded using various measurement processors and the corresponding heterogeneous software environment.

SUMMARY

It is an object of the present invention to provide an improved method for operating a sensor unit of a vehicle.

According to a first aspect of the present invention, the objective may be attained by an example method in accordance with the present invention. In accordance with one example embodiment of the present invention, an example method is provided for operating a sensor unit of a vehicle, comprising the steps:
  providing a time signal for the sensor unit of a first vehicle, it also being possible to provide the time signal for at least one sensor unit of a second vehicle;
  controlling sensor devices of the sensor unit using the time signal for detecting an environment of the vehicle in a temporally defined manner; and
  providing the detected environment data.

In this manner, it is possible to obtain temporally synchronous sensor data, which make it possible to produce an environment model for example. Viewed globally, the time signal is synchronized for all the sensor units involved, which improves the usability of the sensor data. For example, in this manner it is also possible to perform comparative measurements between the different sensor units. This makes it possible to develop the environment model to be as close to reality as possible.

According to a second aspect of the present invention, the object may be attained by an example sensor unit of a vehicle in accordance with the present invention. In one example embodiment in accordance with the present invention, the sensor unit comprises:
  a time signal device for providing a time signal for a defined number of sensor devices, the sensor devices being able sensorially to detect an environment of the vehicle in a temporally defined manner;
  it being possible to provide the time signal also for at least one further sensor unit of a second vehicle; and
  the detected sensor data being provided.

In this manner, a time signal synchronized across system boundaries is used, which is utilized, e.g., for producing the environment model based on the sensor data. In this manner it is possible advantageously to reduce a technical effort for sensor units in the vehicles. The environment model produced in this manner may be ascertained externally for example and transmitted to the vehicles in a radio-based manner, which supports e.g. a highly accurate localization of the vehicles.

According to a third aspect of the present invention, the object may be attained by an example computer program comprising commands that prompt a computer, when executing the computer program, to implement a provided method. Advantageously, the method may be developed in this manner as software and may thereby be modified and adapted in a simple and efficient manner.

According to a fourth aspect of the present invention, the object may be attained by an example machine-readable storage medium, on which the provided computer program is stored.

Advantageous developments of the method according to the present invention are described herein.

One advantageous development of the example method provides for the time signal to be a GNSS time signal. This makes it advantageously possible to use a readily available globally synchronized time signal, which is readily provided in the vehicles by way of an antenna.

Another advantageous development of the example method provides for the time signal to be a time signal of a local master. This makes it possible to define a regionally restricted master, which specifies the time signal for the other sensor units. The other sensor units are able to synchronize with this "local global" time signal, which allows for implementing an operating characteristic of the sensor units of the local group of vehicles using a synchronous time signal.

A further advantageous development of the example method provides for the sensor data to be processed by a processing unit for further use. This makes it possible for example to resimulate the sensor data by way of a measurement technology device in order to provide them afterwards for producing an environment model.

An advantageous development of the example method provides for an environment model to be produced using the sensor data of multiple sensor units. This advantageously produces the environment model using sensor data of multiple sensor units, which produces a consistent environment model that is based on time-synchronized sensor data of the sensor units. A high accuracy and thus a high use value of the environment model are advantageously supported in this manner.

Another advantageous development of the example method also provides for controlling actuators of the vehicle using the time signal. This makes it possible for example to control the sensor units using time-synchronized actuators, whereby sensor data of multiple sensor units are detected in synchronous fashion.

Another advantageous development of the example method provides for the time signal device to be designed for providing a GNSS time signal. This makes it possible to provide a global GNSS signal as a synchronized time signal for all sensor units. This is preferably possible in a simple manner using an antenna unit (device) on the vehicles.

Another advantageous development of the example method provides for the time signal device to be designed for providing a time signal of a local master. An alternative is implemented in this manner for providing a regionally synchronized time signal in a regionally restricted environment of vehicles or sensor units. Preferably, a definition of a master may be implemented via a handshake method. An identification character makes it possible to track which time signal was the local master in which time segment.

Further measures improving the present invention are presented in greater detail below with reference to figures together with the description of the preferred exemplary embodiments of the present invention. The figures are not necessarily executed true to scale.

DETAILED DESCRIPTION OF THE PRESENT INVENTION

In accordance with the present invention, a global time basis is provided for multiple sensor units. This creates a common time basis, which allows for an evaluation of time-synchronized data (for example by vehicle bus, sensor data, environment model, etc.) across vehicles.

Figure 1:
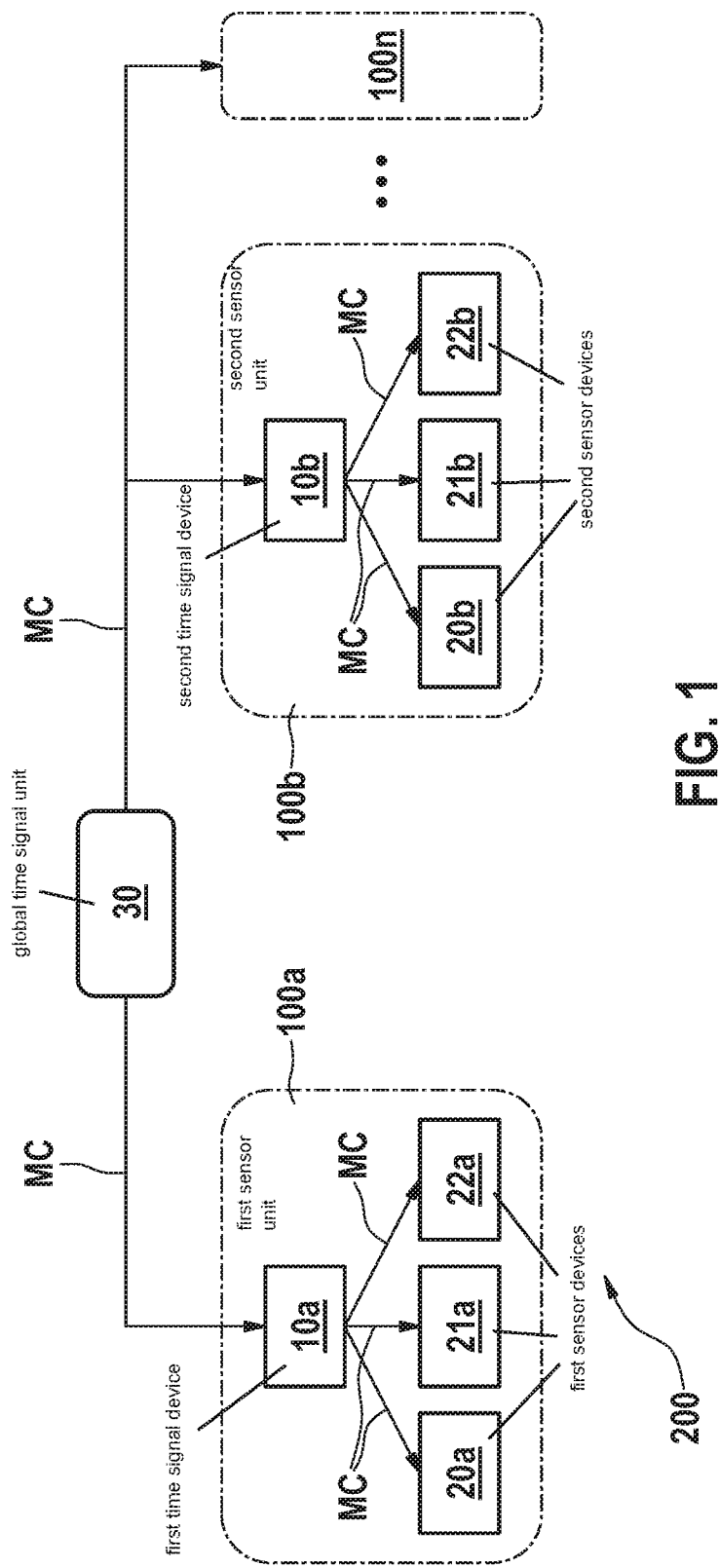
FIG. 1 shows a fundamental general view of a first specific embodiment of a provided sensor unit in accordance with the present invention.

FIG. 1 shows a sensor system 200 of a group of sensor units (devices) 100a ... 100n, which are respectively situated in a vehicle (e.g., cargo truck). A first time signal device 10a is situated on sensor unit 100a, which forwards a time signal MC to a group of first sensor devices 20a, 21a, 22a. Not shown in the figure is the fact that time signal MC may also be provided for controlling actuators, which control for example the sensor devices 20a, 21a, 22a (e.g., radar sensors, LiDAR sensors, cameras, etc.) for detecting an environment of the vehicle.

A second sensor unit 100b is constructed in an analogous manner to first sensor unit 100a and is therefore not described in greater detail here.

Furthermore, a sensor unit 100n is also indicated, which is developed in an analogous manner to sensor units 100a, 100b.

A global time signal unit (device) 30 may also be seen, which supplies a synchronized time signal MC to all time signal devices 10a ... 10n of sensor units 100a ... 100n. In this manner, a global time signal MC is provided for all sensor units 100a ... 100n of sensor system 200, as a result of which the sensor data of the sensor devices have a higher informational content.

With the aid of the synchronized time signal MC, sensor data having a standard time stamp are thus provided in a system-spanning manner, which improves a processing of sensor data of the individual sensor devices 20a, 21a, 22a because these are standardized in terms of time and as a result may be used for producing a central environment model. This advantageously supports a high degree of synchronicity of the sensor data provided by sensor units 100a ... 100n, whereby sensor units 100a ... 100n provide time-synchronized sensor data for further use.

Ultimately, sensor system 200 is brought to the same time basis by way of a temporally highly accurate time signal or time pulse. Since this time signal is provided by a global satellite-based GNSS system, it is available and comparable across system boundaries.

The sensor data ascertained in this manner may be forwarded for example to a detection device (not shown), which combines the detected sensor data and subsequently transmits them to a production device which produces the environment model and transmits it wirelessly to the vehicles. In this manner, it is possible to produce highly accurate environment model for the purpose of localizing the vehicles, which advantageously minimizes a use of sensor devices in the respective vehicles.

Advantageously, it may also be provided to use the sensor units 100a ... 100n synchronized in this manner for mutual comparison measurements, which makes it possible for example to check a correct operating characteristic of sensor units 100a ... 100n.

It is preferably provided for the sensor data detected by sensor units 100a ... 100n to be supplied to a central processing device of the vehicle and/or to the mentioned detection device (not shown). The detection device may be used for example to reproduce and/or post-process the detected sensor data.

The detection device collects the sensor data and checks them for consistency. Mathematical detection algorithms running on the detection device may be improved or optimized by using the synchronous sensor data.

Figure 2:
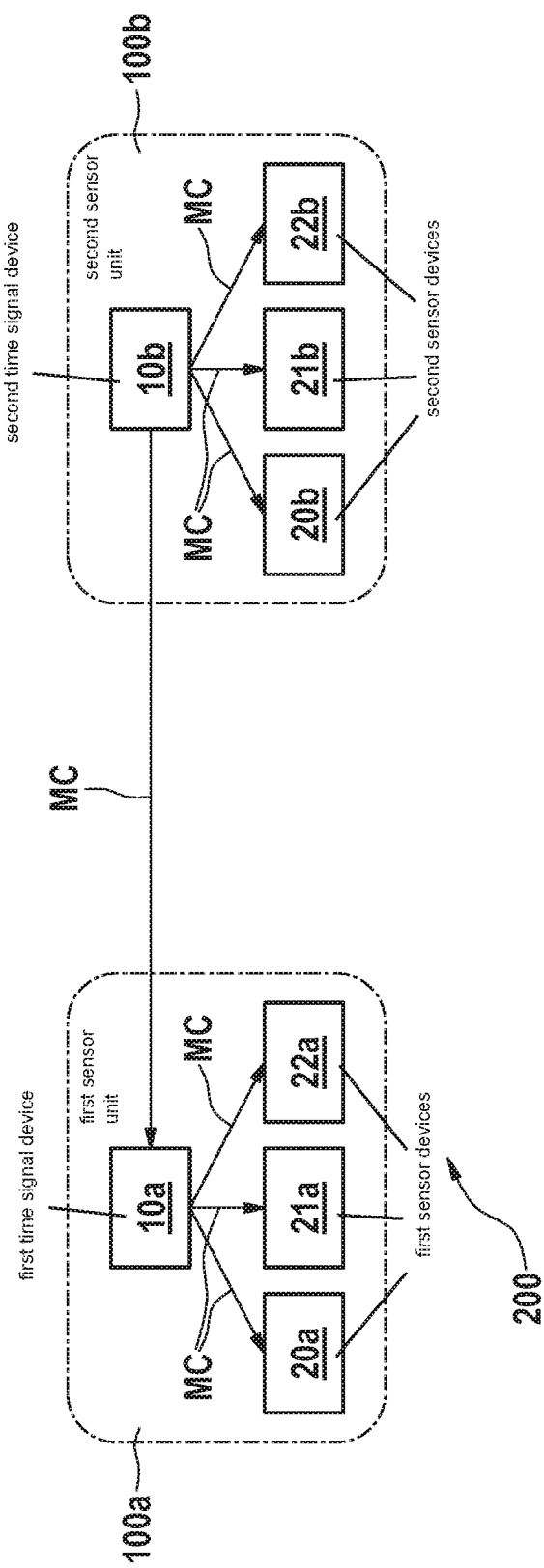
FIG. 2 shows a fundamental general view of a second specific embodiment of a provided sensor unit in accordance with the present invention.

FIG. 2 shows another general view of another specific embodiment of sensor system 200. In this case, time signal device 10b of sensor unit 100b represents a local master, which provides the time signal MC for first sensor unit 100a. For this purpose, time signal MC may be transmitted for example via WLAN between sensor units 100a, 100b. For this purpose, there may be a provision to develop a network of infrastructural devices (not shown), which is provided for forwarding the time signal MC via WLAN or Bluetooth. In this manner, it is advantageously possible to implement a local restriction of a sensor system 200 having multiple sensor units 100a ... 100n, which is supplied with a synchronous time signal MC.

For this purpose, it may be provided for example to determine and also to unsubscribe again the respective local master via a handshake method. Advantageously, it is thereby possible for a specific master to provide for a specific period of time a defined synchronous time signal MC for a defined local group of sensor units 100a ... 100n.

In this manner, a common time basis is created for multiple different measurement structures and measurement systems that are not necessarily connected. This makes it advantageously possible to make the sensor data of the different vehicles comparable and to allow for a synchronicity of the sensor data across system boundaries.

The restriction to one slave sensor unit shown in FIG. 2 is merely by way of example. Of course, there may also be a provision for the master to supply the time signal MC to multiple slave sensor units (not shown in the figures).

Figure 3:
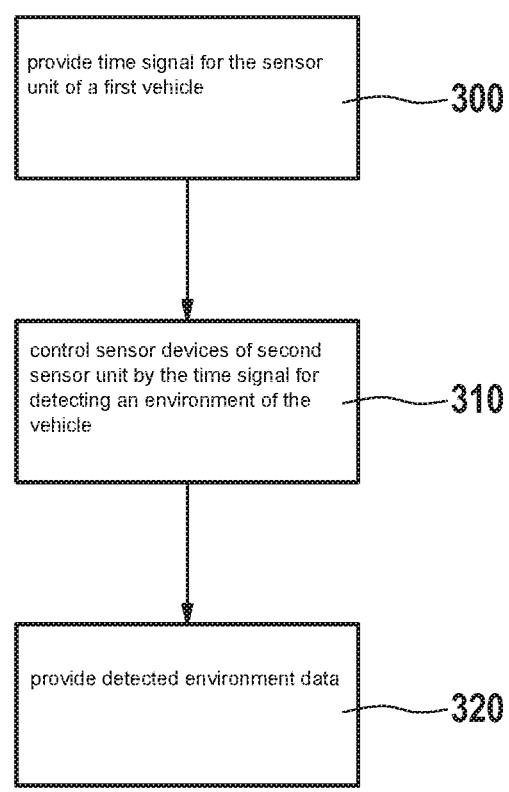
FIG. 3 shows a fundamental sequence of an example provided method for operating a sensor unit of a vehicle in accordance with the present invention.

FIG. 3 shows a fundamental sequence of a method for operating a sensor unit 100a ... 100n of a vehicle.

In a step 300, a time signal MC is provided for the sensor unit 100a of a first vehicle, it also being possible to provide the time signal MC for at least one sensor unit 100b of a second vehicle.

In a step 310, sensor devices 20a ... 20n of sensor unit 100a are controlled by time signal MC for detecting an environment of the vehicle in a temporally defined manner.

In a step 320, the detected environment data are provided.

Preferably, the method may be developed as software, which is executed on sensor unit 100a . . . 100n and which may be stored on a computer-readable storage medium. This advantageously supports a simple adaptability of the method.

When implementing the present invention, one skilled in the art will also produce specific embodiments that are not explained above.

What is claimed is:

1. A method for operating a sensor unit of a vehicle, the method comprising:
providing, via a time signal device of a plurality of time signal devices, a time signal for the sensor unit of a plurality of sensor units of a first vehicle, wherein the time signal device is on the sensor unit;
controlling a group of sensor devices of the sensor unit, using the time signal, to detect an environment of the vehicle in a temporally defined manner; and
providing, via the sensor devices, sensor data of the detected environment;
wherein the time signal device forwards the time signal to the group of sensor devices,
wherein a global time signal unit supplies a synchronized time signal to the plurality of time signal devices of the plurality of sensor units, so that the global time signal is provided for all of the sensor units, as a result of which sensor data of the sensor devices have a higher informational content, and
wherein with the synchronized time signal, the sensor data have a standard time stamp and are provided in a system-spanning manner, which improves a processing of the sensor data of the sensor devices because these are standardized in terms of time and as a result are used for producing a central environment model, and wherein this provides synchronicity of the sensor data from the sensor units, which provide time-synchronized sensor data.

2. The method as recited in claim 1, further comprising:
providing the time signal for at least one sensor unit of a second vehicle.

3. The method as recited in claim 1, wherein the time signal is a GNSS time signal.

4. The method as recited in claim 1, wherein the time signal is a time signal of a local master.

5. The method as recited in claim 4, further comprising:
producing an environment model using the sensor data of multiple sensor units.

6. The method as recited in claim 1, wherein the sensor data are processed by a processing device for further use.

7. The method as recited in claim 1, wherein the time signal is also used to control actuators of the vehicle.

8. A sensor unit of a vehicle, comprising:
a time signal device to provide a time signal for a plurality of sensor devices, wherein an environment of the vehicle is sensorially detectable in a temporally defined manner using the sensor devices, wherein the time signal device provides a time signal for the sensor unit of a plurality of sensor units of a first vehicle, wherein the time signal device is on the sensor unit, wherein a group of sensor devices of the sensor unit is controlled, using the time signal, to detect an environment of the vehicle in the temporally defined manner;
wherein the sensor devices are configured to provide detected sensor data of the detected environment,
wherein the time signal device is configured to forward the time signal to the group of sensor devices,
wherein a global time signal unit supplies a synchronized time signal to the plurality of time signal devices of the plurality of sensor units, so that the global time signal is provided for all of the sensor units, as a result of which sensor data of the sensor devices have a higher informational content, and
wherein with the synchronized time signal, the sensor data have a standard time stamp and are provided in a system-spanning manner, which improves a processing of the sensor data of the sensor devices because these are standardized in terms of time and as a result are used for producing a central environment model, and wherein this provides synchronicity of the sensor data from the sensor units, which provide time-synchronized sensor data.

9. The sensor unit as recited in claim 8, wherein the time signal device is further configured to provide the time signal to at least one sensor unit of a second vehicle.

10. The sensor unit as recited in claim 8, wherein the time signal device is configured to provide a GNSS time signal.

11. The sensor unit as recited in claim 10, wherein the time signal device is configured to provide a time signal of a local master as the time signal.

12. A sensor system, comprising:
at least two sensor units, each of the sensor units including:
a time signal device configured to provide a time signal for a plurality of sensor devices, wherein an environment of the vehicle is sensorially detectable in a temporally defined manner using the sensor devices, wherein the time signal device provides a time signal for the sensor unit of a plurality of sensor units of a first vehicle, wherein the time signal device is on the sensor unit, wherein a group of sensor devices of the sensor unit is controlled, using the time signal, to detect an environment of the vehicle in the temporally defined manner;
wherein the sensor devices are configured to provide detected sensor data of the detected environment,
wherein the time signal device is configured to forward the time signal to the group of sensor devices,
wherein a global time signal unit supplies a synchronized time signal to the plurality of time signal devices of the plurality of sensor units, so that the global time signal is provided for all of the sensor units, as a result of which sensor data of the sensor devices have a higher informational content, and
wherein with the synchronized time signal, the sensor data have a standard time stamp and are provided in a system-spanning manner, which improves a processing of the sensor data of the sensor devices because these are standardized in terms of time and as a result are used for producing a central environment model, and wherein this provides synchronicity of the sensor data from the sensor units, which provide time-synchronized sensor data.

13. A non-transitory machine-readable storage medium, on which is stored a computer program, which is executable by a processor, comprising:
a program code arrangement having program code for operating a sensor unit of a vehicle, by performing the following:
providing, via a time signal device of a plurality of time signal devices, a time signal for the sensor unit of a plurality of sensor units of a first vehicle, wherein the time signal device is on the sensor unit;

controlling a group of sensor devices of the sensor unit, using the time signal, to detect an environment of the vehicle in a temporally defined manner; and providing, via the sensor devices, sensor data of the detected environment;

wherein the time signal device is configured to forward the time signal to the group of sensor devices, wherein a global time signal unit supplies a synchronized time signal to the plurality of time signal devices of the plurality of sensor units, so that the global time signal is provided for all of the sensor units, as a result of which sensor data of the sensor devices have a higher informational content, and wherein with the synchronized time signal, the sensor data have a standard time stamp and are provided in a system-spanning manner, which improves a processing of the sensor data of the sensor devices because these are standardized in terms of time and as a result are used for producing a central environment model, and wherein this provides synchronicity of the sensor data from the sensor units, which provide time-synchronized sensor data.

\* \* \* \* \*